United States Patent
Zeng et al.

(10) Patent No.: US 12,182,990 B2
(45) Date of Patent: Dec. 31, 2024

(54) BATTERY COMPONENT INSPECTION BASED ON OPTICAL AND THERMAL IMAGING

(71) Applicant: GM GLOBAL TECHNOLOGY OPERATIONS LLC, Detroit, MI (US)

(72) Inventors: Wei Zeng, Oakland Township, MI (US); Scott E. Parrish, Farmington Hills, MI (US); Jing Gao, Rochester, MI (US); Brian J. Koch, Berkley, MI (US); Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 344 days.

(21) Appl. No.: 17/743,862

(22) Filed: May 13, 2022

(65) Prior Publication Data

US 2023/0368367 A1    Nov. 16, 2023

(51) Int. Cl.
*G06T 7/00* (2017.01)
*G06T 7/32* (2017.01)
*G06T 7/33* (2017.01)
*G06V 10/58* (2022.01)
*H01M 10/42* (2006.01)

(52) U.S. Cl.
CPC ............... *G06T 7/001* (2013.01); *G06T 7/32* (2017.01); *G06T 7/337* (2017.01); *G06V 10/58* (2022.01); *H01M 10/4285* (2013.01); *G06T 2207/10048* (2013.01); *G06T 2207/30108* (2013.01)

(58) Field of Classification Search
CPC ........... G06T 7/001; G06T 7/32; G06T 7/337; G06T 2207/10048; G06T 2207/30108; G06T 2207/10024; G06T 7/0004; G06V 10/58; G06V 10/143; G06V 10/806; G01N 21/88; G01N 25/72; H01M 10/4285; G01J 5/48
USPC ......................................................... 382/141
See application file for complete search history.

(56) References Cited

U.S. PATENT DOCUMENTS

| | | | |
|---|---|---|---|
| 2020/0184632 A1* | 6/2020 | Crane | G06T 7/586 |
| 2022/0062997 A1* | 3/2022 | Liu | B33Y 30/00 |
| 2022/0163395 A1* | 5/2022 | Li | G01J 5/0275 |
| 2022/0357294 A1* | 11/2022 | Joung | H01M 10/4285 |
| 2023/0258603 A1* | 8/2023 | Dulaney | H01M 10/4873/598 |
| 2024/0133819 A1* | 4/2024 | Schulte | H01M 10/4285 |

* cited by examiner

*Primary Examiner* — Tom Y Lu
*Assistant Examiner* — Pardis Sohraby
(74) *Attorney, Agent, or Firm* — CANTOR COLBURN LLP (57) ABSTRACT

A system for inspecting a battery component includes a heating device configured to heat a surface of the battery component to a selected temperature, an optical-visible imaging device configured to take an optical image of the surface, a thermal imaging device configured to take a thermal image of the surface, and a processor configured to acquire the optical image and the thermal image. The processor is configured to correlate the thermal image with the optical image, identify a feature of interest in at least one of the optical image and the thermal image, determine a geometric characteristic and a temperature characteristic associated with the feature of interest, and determine whether the feature of interest is a defect based on the geometric characteristic and the temperature characteristic.

20 Claims, 6 Drawing Sheets

BATTERY COMPONENT INSPECTION BASED ON OPTICAL AND THERMAL IMAGING

INTRODUCTION

The subject disclosure relates to battery inspection, and more particularly to inspection of battery cell electrodes.

Battery cells are used in various applications, such as automotive applications (e.g., in electric and hybrid vehicles). Discontinuities or defects can arise during manufacture of battery cells. For example, some electrodes are constructed by depositing a coating of an electrode material on a substrate. Surface and internal defects, such as splatters and undesirable particles, can arise during the deposition process. Inspection of battery cells and their constituents for these and other defects is important in order to ensure proper function.

SUMMARY

In one exemplary embodiment, a system for inspecting a battery component includes a heating device configured to heat a surface of the battery component to a selected temperature, an optical-visible imaging device configured to take an optical image of the surface, a thermal imaging device configured to take a thermal image of the surface, and a processor configured to acquire the optical image and the thermal image. The processor is configured to correlate the thermal image with the optical image, identify a feature of interest in at least one of the optical image and the thermal image, determine a geometric characteristic and a temperature characteristic associated with the feature of interest, and determine whether the feature of interest is a defect based on the geometric characteristic and the temperature characteristic.

In addition to one or more of the features described herein, the battery component is an electrode of a battery.

In addition to one or more of the features described herein, the heating device is configured to uniformly heat the battery component, the heating system including at least one of a heating element configured to directly contact the battery component, a non-contact device, and a heating chamber.

In addition to one or more of the features described herein, the feature of interest includes at least one of a surface feature, and an internal feature disposed below the surface.

In addition to one or more of the features described herein, the system is configured to automatically inspect the battery component in conjunction with a battery cell manufacturing process.

In addition to one or more of the features described herein, the temperature characteristic is selected from at least one of: a temperature value, a temperature distribution, a temperature variation, and a difference between a first temperature at a location corresponding to the feature of interest and a second temperature at another location of the thermal image.

In addition to one or more of the features described herein, the feature of interest is determined to be a defect based on the temperature characteristic corresponding to a reference temperature characteristic, and at least one of a size of the feature of interest being above a selected size threshold, and a pattern of the feature corresponding to a reference pattern.

In addition to one or more of the features described herein, at least one of the optical-visible imaging device and the thermal imaging device has a resolution selected distinguish a micro-scale feature.

In addition to one or more of the features described herein, determining whether the feature of interest is a defect is performed based on associating the geometric characteristic and the temperature characteristic with a known defect based on a look up table.

In another exemplary embodiment, a method of inspecting a battery component includes acquiring an optical image of a surface of the battery component and a thermal image of the surface, where at least one of the optical image and the thermal image is taken when the surface is heated to a selected temperature, correlating the thermal image with the optical image, identifying a feature of interest in at least one of the optical image and the thermal image, determining a geometric characteristic and a temperature characteristic associated with the feature of interest, and determining whether the feature of interest is a defect based on the geometric characteristic and the temperature characteristic.

In addition to one or more of the features described herein, the feature of interest includes at least one of a surface feature, and an internal feature disposed below the surface.

In addition to one or more of the features described herein, the acquiring is performed in conjunction with a battery cell manufacturing process.

In addition to one or more of the features described herein, the temperature characteristic is selected from at least one of: a temperature value, a temperature distribution, a temperature variation, and a difference between a first temperature at a location corresponding to the feature of interest and a second temperature at another location of the thermal image.

In addition to one or more of the features described herein, the feature of interest is determined to be a defect based on the temperature characteristic corresponding to a reference temperature characteristic, and at least one of a size of the feature of interest being above a selected size threshold, and a pattern of the feature corresponding to a reference pattern.

In addition to one or more of the features described herein, at least one of the optical image and the thermal image is taken at a resolution selected to distinguish a micro-scale feature.

In addition to one or more of the features described herein, determining whether the feature of interest is a defect is performed based on associating the geometric characteristic and the temperature characteristic with a known defect based on a look up table.

In yet another exemplary embodiment, a computer program product for inspecting a battery component includes a computer-readable memory that has computer-executable instructions stored thereupon, the computer-executable instructions when executed by a processor cause the processor to perform operations. The operations include acquiring an optical image of a surface of a battery component and a thermal image of the surface, where at least one of the optical image and the thermal image is taken when the surface is heated to a selected temperature, correlating the thermal image with the optical image, identifying a feature of interest in at least one of the optical image and the thermal image, determining a geometric characteristic and a temperature characteristic associated with the feature of interest, and determining whether the feature of interest is a defect based on the geometric characteristic and the temperature characteristic.

In addition to one or more of the features described herein, the temperature characteristic is selected from at least one of: a temperature value, a temperature distribution, a temperature variation, and a difference between a first temperature at a location corresponding to the feature of interest and a second temperature at another location of the thermal image.

In addition to one or more of the features described herein, the feature of interest is determined to be a defect based on the temperature characteristic corresponding to a reference temperature characteristic, and at least one of a size of the feature of interest being above a selected size threshold, and a pattern of the feature corresponding to a reference pattern.

In addition to one or more of the features described herein, at least one of the optical image and the thermal image is taken at a resolution selected to distinguish a micro-scale feature.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for inspecting or evaluating battery cells, and/or non-destructively detecting defects and other features of interest in battery cells and battery components. Embodiments include a system for inspecting an electrode or other component configured to be used in a battery cell (e.g., a pouch-type battery cell). The system may be configured for in-line imaging and inspection of battery components during a manufacturing process, or configured for use in other contexts.

The system includes an optical-visible camera or optical-visible imaging device, a thermal imaging device (e.g., an infrared camera) and a heating device configured to uniformly heat at least a surface of an electrode or other battery component. The system is configured to take one or more visible images of the component and one or more thermal images of the component, correlate the images, and identify features therein. The system is further configured to determine whether an identified feature is a defect (on the surface and/or an internal defect) based on geometric characteristics and temperature characteristics of the feature. The system may include components for additional analysis, such as micro-scale analysis and thermal emissivity and thermal conductive analysis. The heating device may be a heating element for directly contacting a battery component, a non-contacting device (e.g., a long-wavelength optical-based heating device) to heat the component surface, and/or an environmental heating chamber for enclosing the battery component.

Embodiments described herein present numerous advantages and technical effects. The embodiments provide for improved inspection methods, which are able to detect defects effectively both at the surface and below the surface of an electrode or other battery component. For example, analysis of optical and thermal images as discussed herein provides for identification of defects that are difficult to identify even with off-line methods. In addition, the embodiments provide a reliable and repeatable off-line and/or in-line inspection process that can be performed in an automated fashion as part of a manufacturing process or in any other desired context.

Figure 1:
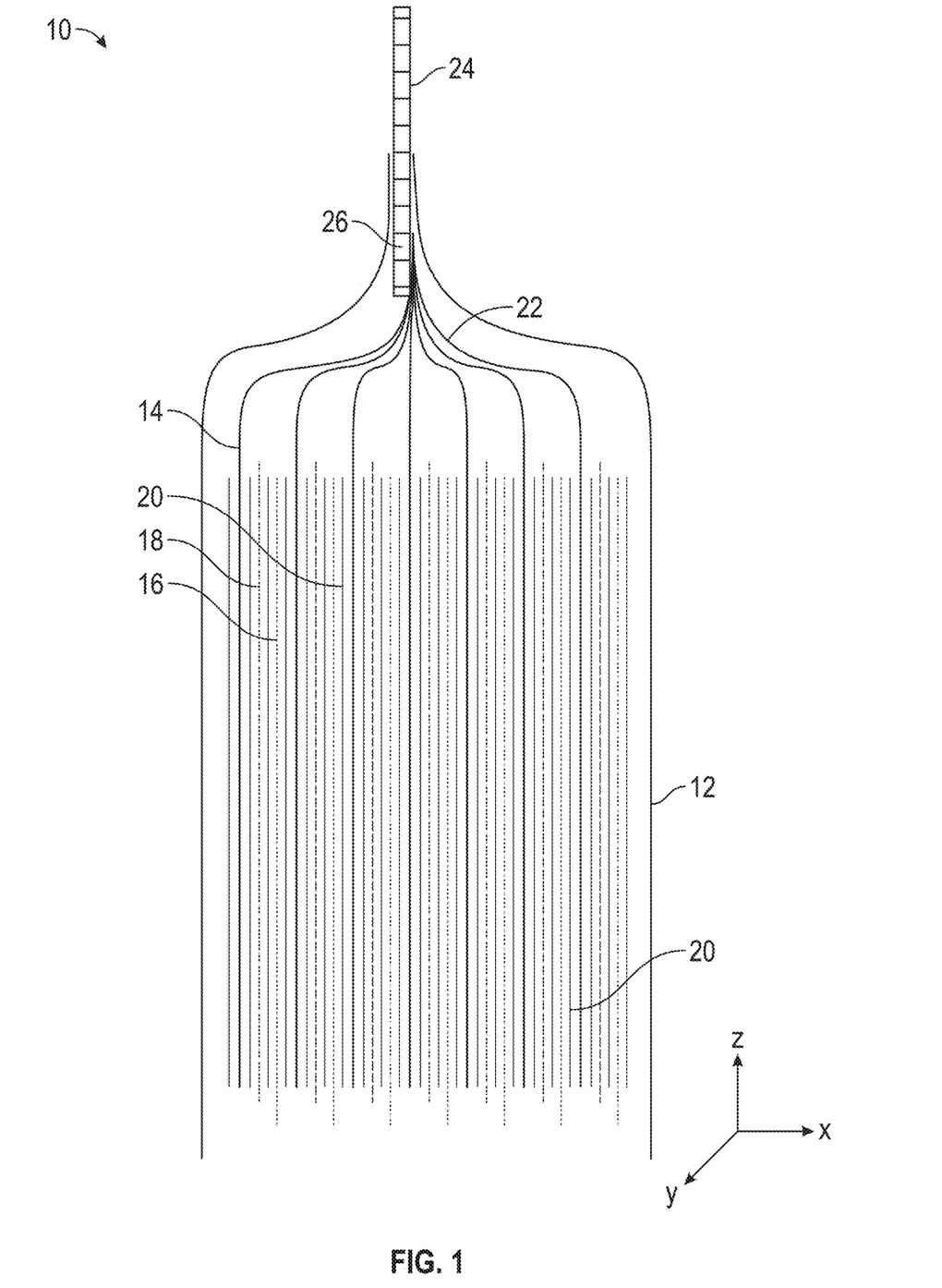
FIG. 1 depicts an example of a pouch-type battery cell.

FIG. 1 depicts an example of a pouch-type battery cell 10, components of which can be inspected or analyzed via the systems and methods described herein. It is noted that the embodiments described herein are not limited to the specific example of FIG. 1, or any other specific battery type. For example, embodiments described herein can be applicable to cylindrical cells, prismatic cells and others.

The battery cell 10 includes a flexible envelope or pouch 12 that is sealed to enclose a plurality of stacked unit cells (cell stack). The pouch 12 may be an aluminum laminated foil or other suitable pouch material. Each unit cell includes a negative electrode or anode 14, and a positive electrode or cathode 16. The anodes and cathodes are made from selected electrically conductive materials and configured as thin sheets or foils. Each unit cell also includes a separator 18 made from an electrically insulating material such as a polymer or a ceramic. An active material 20, such as a graphite or a material including Lithium, is disposed in the pouch 12 between the various layers of the unit cells.

As shown in FIG. 1, each anode 14 (also referred to as an anode foil) extends away from the unit cells, and the anode foils 14 are attached together as a foil stack 22. The foil stack 22 welds foils together by, for example, a primary ultrasonic weld. The foil stack 22 is in turn attached to an electrically conductive tab 24 via a weld 26. The tab 24 in this example is a negative terminal tab. The cathode foils 16 may be similarly welded to a positive terminal tab (not shown).

Methods of inspecting one or more components of the battery cell 10 and detecting defects as discussed herein may be performed at any time during or after manufacture of the battery cell 10. Acquisition of images may be performed in-line during manufacturing, or off-line, such as via a dedicated inspection station of completed battery cells. In-line acquisition may occur, for example, prior to assembling a battery cell.

Figure 2:
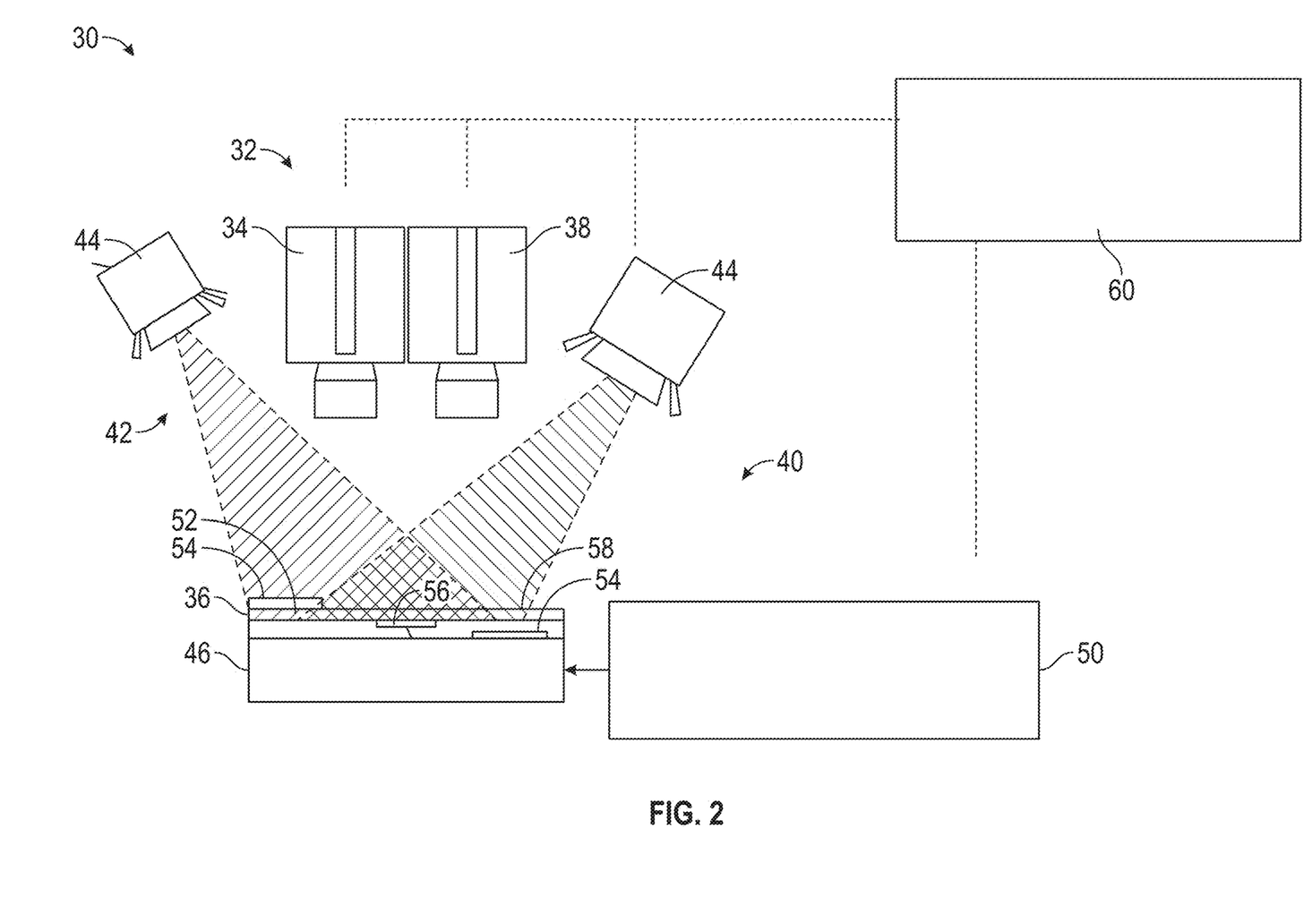
FIG. 2 depicts an inspection system for identifying defects in a battery component, in accordance with an exemplary embodiment.

FIG. 2 depicts an embodiment of an imaging system 30 for inspecting a battery component. The imaging system 30, in this embodiment, is disposed in conjunction with an existing manufacturing system (e.g., for in-line imaging and/or analysis of battery components). However, the imaging system 30 can be used in any desired context (e.g., quality control during or after manufacturing).

The imaging system 30 is discussed in conjunction with inspection of an electrode of a pouch-type battery cell (e.g., the anode 14 and/or cathode 16), but is not so limited. The inspection system 30 may be used to inspect any desired component of any suitable type of battery cell or battery assembly.

The imaging system 30 may be used to identify one or more features of interest at or below a surface of the battery component being inspected. A "feature of interest," in an embodiment, includes any feature detectable in an acquired thermal image and/or optical image that could potentially cause damage to, or contribute to sub-optimal operation of, a battery cell. Examples of such features include pores, folds, tears, particles, splatters and others. Further examples include spotty plating in aged cells caused by non-homogeneous anode utilization, undispersed particles in electrodes, active materials distributed inconsistently in blended electrodes (e.g., splatters), and metallic particle contamination from electrode fabrication. The imaging system 30 can thus be used to detect non-homogeneities or discontinuities that occur during manufacturing or due to manufacturing errors, and non-homogeneities that may arise during the life of a battery cell.

The imaging system 30 includes at least one imaging assembly 32 that includes an optical-visible imaging device 34 such as a camera for taking visible light images of a battery component 36, such as an electrode (e.g., the anode 14 of FIG. 1). The imaging assembly 32 also includes a thermal imaging device 38, such as an infrared camera, for taking thermal images of the battery component 36.

The imaging system 30 also includes a heating assembly 40 configured to uniformly heat the battery component 36 (e.g., heat a surface and/or interior of the component). The component is "uniformly" heated when the entirety of the battery component (or portion thereof) is at the same temperature or a variation of the temperature is below a selected threshold (e.g., a variation of 0.1 degrees C. or less).

In the embodiment of FIG. 2, the heating assembly 40 includes a temperature excitation assembly 42 including one or more light or laser-illumination sources 44 configured to direct a beam of long wavelength radiation (e.g., infrared light) to the battery component 36. The beam has a beam width that corresponds to at least the size of a field of view (FOV) of the optical-visible imaging device 34 and/or the thermal imaging device 38. In addition, or alternatively, the heating assembly 40 includes a heating device 46 having a heating element 56 (e.g., a resistive heater) and a controller 50. The heating element 56 may be configured to directly contact the battery component, or may be configured to heat an environment around the battery component (e.g., as part of a heating chamber). One or more temperature sensors 54 may be disposed relative to the component 36.

The imaging system 40 may be incorporated as an in-line inspection system that can be used to image a component and analyze images for feature detection during manufacturing. For example, the imaging devices, the light source 44 (e.g., long wavelength light or laser-illumination source) and/or the heating device 46 can be mounted on one or more suitable support structures relative to a conveyor on which the battery component 36 is transported between various manufacturing stations.

FIG. 2 also depicts examples of locations at which a defect or discontinuity may be located. For example, the battery component 36 may include a defect in an interior 52 of the battery component and/or a defect on or at an upper surface 58 of the battery component 36.

The imaging system 30 and aspects of imaging and analysis methods described herein may be controlled by one or more processing devices. The processing device(s) may be a local processing device such as a processor 60 and/or a remote processing device (connected via a network).

Figure 3:
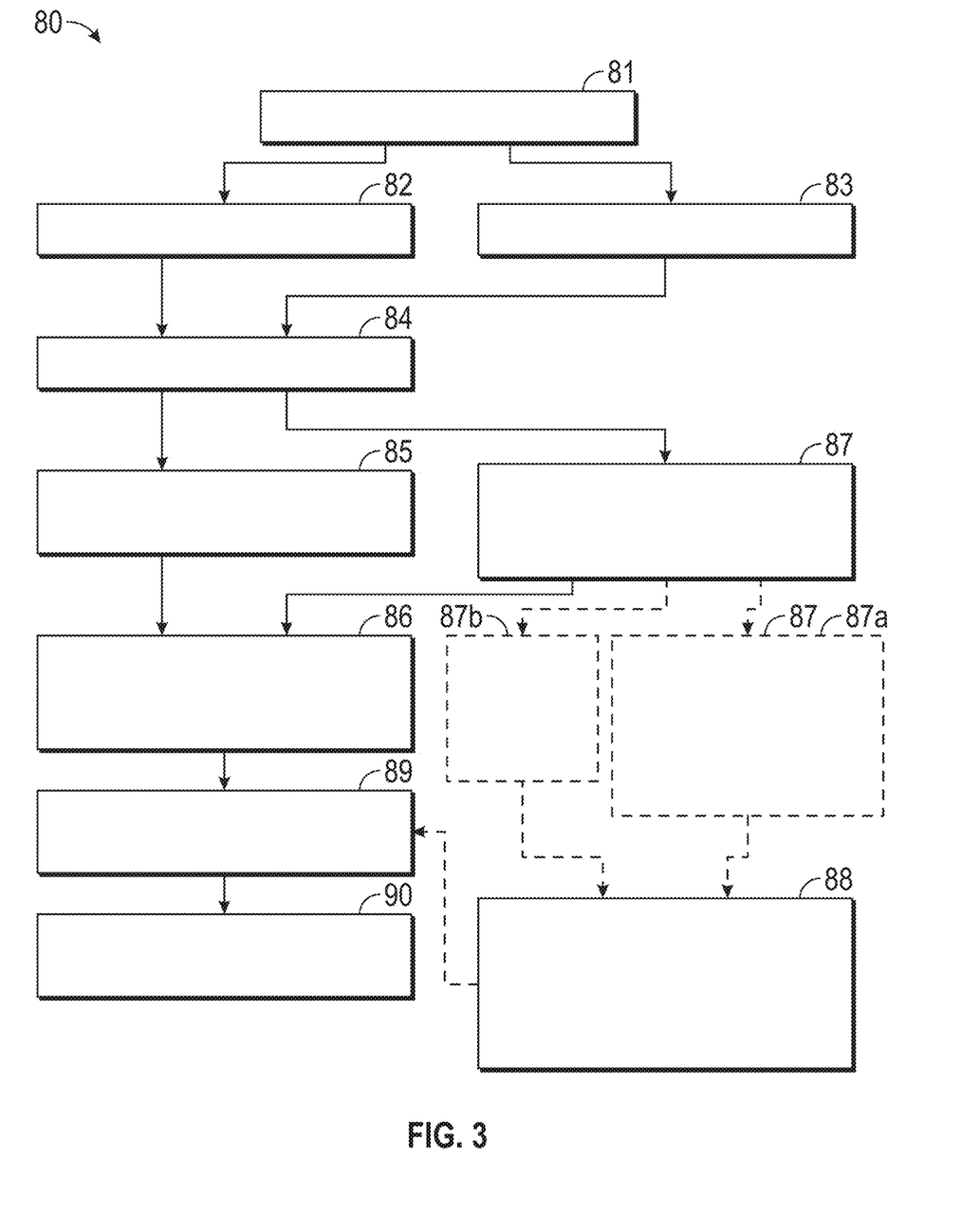
FIG. 3 is a flow diagram depicting aspects of a method of inspecting a battery component, in accordance with an exemplary embodiment.

FIG. 3 illustrates an embodiment of a method 80 of inspecting a battery component and/or detecting or identifying discontinuities. Aspects of the method 80 may be performed by a processor or processors, such as the processor 60. It is noted the method 80 may be performed by any suitable processing device or system, or combination of processing devices.

The method 80 includes a number of steps or stages represented by blocks 81-90. The method 80 is not limited to the number or order of steps therein, as some steps represented by blocks 81-90 may be performed in a different order than that described below, or fewer than all of the steps may be performed.

Aspects of the method 80 are discussed in conjunction with the imaging system 30, which may be an in-line station in a manufacturing system, or an off-line station. The method 80 is not so limited and can be used with any device or system having imaging and analysis capabilities described herein.

At block 81, the temperature excitation assembly 42 is used to heat at least the surface of the battery component 36. For example, the component 36 is an anode formed by a coating of anode material deposited in a substrate (e.g., current collector), and laser energy is applied to heat at least the entire anode material. The temperature excitation assembly 42 is controlled to heat the battery component 36 to a uniform temperature.

For example, as the temperature excitation assembly 42 applies energy to the battery component 36 and heats the battery component 36, temperature measurements are performed at various locations of the battery component 36, and temperature as a function of location (e.g., according to pixel number) is estimated. If the variation in temperature between a maximum temperature (e.g., highest measured temperature) and a minimum temperature (e.g., a lowest measured temperature or a reference temperature) is below a threshold, the temperature is considered uniform and images of the battery component 36 can be taken. An example of a temperature variation threshold is a variation of 0.3° Celsius or less.

At block 82, one or more optical (visible light) images of a surface of the battery component 36 are taken. For example, an electrode may be imaged after the electrode is constructed or deposited and prior to assembling the electrode with other components of a battery cell (e.g., pouch-type battery cell). In another example, a sample of electrode material used to construct the electrode is imaged.

At block 83, one or more thermal images are taken by the thermal imaging device 38. The thermal images and/or the optical images are taken at a selected resolution, such as a resolution that is greater than or equal to an image-resolution threshold. For example, the optical images and/or the thermal images are high resolution images having an image resolution of at least 30 microns (i.e., the image resolution is such that objects as small as about 30 microns in extent are distinguishable).

Although the heating is discussed herein as being performed prior to taking the optical and thermal images, the method 80 is not so limited. For example, optical images may be taken prior to heating. The battery component 36 may then heated as discussed above and one or more thermal images may then be taken.

At block 84, the optical image(s) and the thermal image(s) are correlated with each other or mapped onto each other using any suitable image analysis technique or techniques. For example, any visible feature of the optical image may be mapped onto a corresponding feature of the thermal image for correlation.

At block 85, visible features are identified using at least the optical image. In an embodiment, visible features include features that are visible in the optical image and the thermal image. Such features may be surface defects. Visible features may be identified based on size, area, length, width, shape and/or other geometric characteristics. For example, visible features are features having a size (e.g., diameter or length) that is greater than about 30 microns. In another example, a visible features having a shape or pattern corresponding to a known defects or known feature can be identified.

In an embodiment, visible features (and/or other features having smaller scales than visible features) can be identified using a machine learning algorithm, such as object tracking, digital image correlation, neural networks, classifiers, supervised and unsupervised machine learning, image cross correlation, histogram of gradients and other techniques. Any combination of the above techniques may be employed. The machine learning algorithm is trained using images of the battery component 36 and/or similar components. For example, images of anodes are acquired and labeled to identify features of interest and/or defects, and the algorithm is trained on the images.

At block 86, temperature characteristics of the identified features are estimated, and used to determine whether the identified visible features are defects. For example, a visible feature is determined to be a defect if it has a size greater than about 100 microns (or other selected size), and a temperature value or temperature difference (e.g., between the feature and a surrounding or adjacent region of the image) is above a threshold. A visible feature can be confirmed if the feature appears at the same location in an optical image and a thermal image through the image mapping process.

At block 87, smaller scale features and/or internal features (e.g., features disposed below the surface of the battery component 36) are identified using visual and/or thermal analysis. Internal features may appear in a thermal image, but not be visible or apparent in a corresponding optical image through the image mapping process. Additional analysis of the component 36 can be performed off-line to confirm the internal features. For example, at block 87a, microscopic imaging (e.g., using a stereo microscope and/or scanning electron microscope) can be used to confirm the presence of the internal feature. In addition, or alternatively, micro-scale analysis of internal features can include elemental mapping using X-ray images of the component.

Thermal analysis can be performed at block 87b to identify internal features (e.g., subsurface particles, also referred to as blended particles). For example, an emissivity and/or thermal conductivity analysis is performed to derive an emissivity and/or thermal conductivity of a region corresponding to an internal feature identified via visual analysis.

At block 88, it is determined whether the identified internal features or smaller scale features are defects. In an embodiment, a combination of temperature characteristics and geometric characteristics are compared to reference information. For example, features having a size that meets a selected size threshold, and having a temperature (e.g., temperature value, temperature variation, difference in temperature) that meets a temperature threshold are identified as defects. In another example, features having a pattern corresponding to a reference pattern and temperature that meets a threshold are determined to be defects. In an embodiment, features satisfying geometric criteria and having temperature (that is correlated with emissivity and/or thermal conductivity) above a threshold are determined to be defects.

For example, an identified smaller scale feature is determined to be a defect if the feature diameter $D_{defect}$ is greater than a multiple of the size of a blended particle ($D_{particle}$) or a reference size, and a difference between the temperature of the feature ($T_{particle}$) and the temperature of a surrounding or adjacent region ($T_{surrounding}$) is greater than a selected threshold.

The following relationships show an example of criteria for detection of a smaller scale feature. A feature is determined to be a defect if the following are true:

$$D_{defect} > 3 * D_{particle}, \text{ or } D_{defect} > 30 \text{ microns; and}$$

$$(T_{particle} - T_{surrounding}) > 0.3 \text{ degrees } C.$$

At block 89, larger and smaller scale defects are combined, and size and/or temperature distribution are used to confirm defect detection using the above equations.

At block 90, information relating to determined defects are output to a user, another processor or other location. Outputs may be in the form of an output image annotated with defects, or other information may be output indicative of size, location and/or type of defect.

The processor, and/or other suitable processing device or control device, can effect one or more actions in response to detecting a defect. The manufacturing process can be changed or modified to address a detected defect, and/or any other suitable remedial action can be taken. For example, the manufacturing process can be paused and a component can be removed from a manufacturing station. In another example, the manufacturing process can be adjusted to address a detected defect (e.g., by adjusting anode deposition parameters), and/or to potentially prevent similar defects from arising as subsequent battery cells are manufactured.

Figure 4:
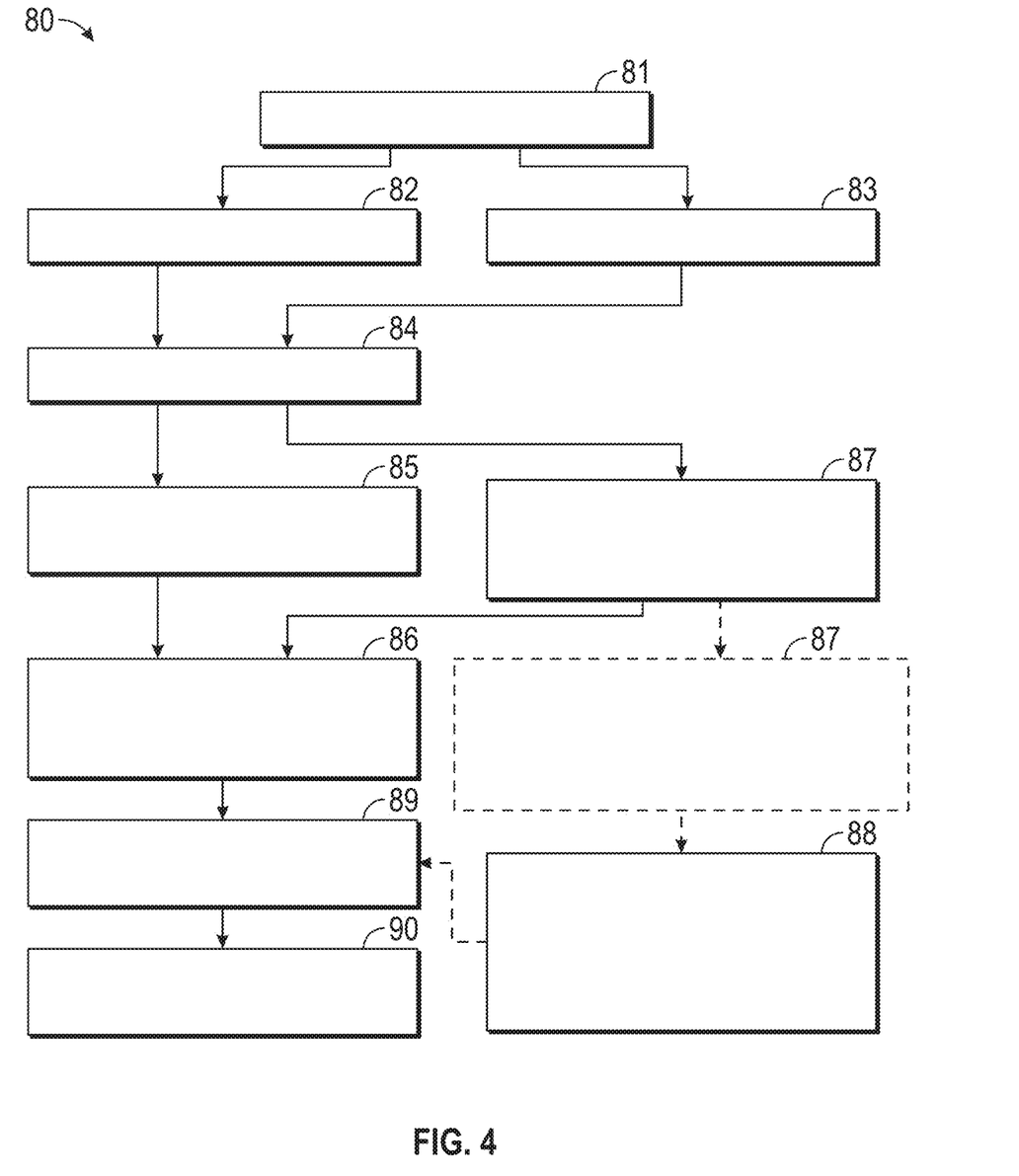
FIG. 4 is a flow diagram depicting aspects of a method of inspecting a battery component, in accordance with an exemplary embodiment.

FIG. 4 depicts another embodiment of the method 80. This embodiment may be suitable or desirable for in-line manufacturing applications and other contexts for which a quick analysis is desired.

In this embodiment, at block 87, size or other geometric characteristic data and temperature data are stored in a look up table or other suitable data structure. Internal and smaller scale features are identified as discussed above, and a temperature and size of each identified feature is input to the data structure to determine whether such features constitute defects.

Figure 5:
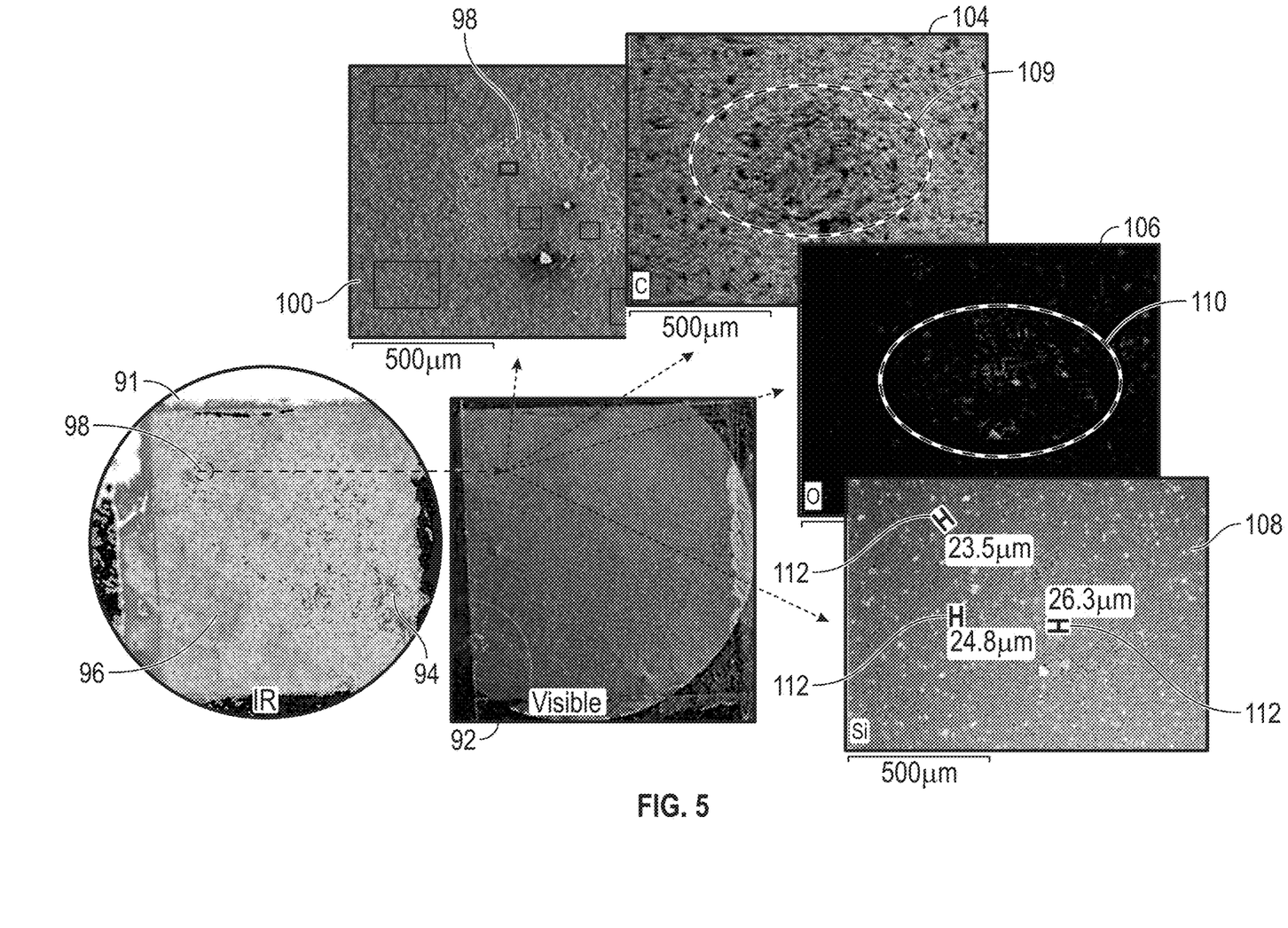
FIG. 5 depicts examples of images generated using the method of FIG. 3 or FIG. 4, and depicts aspects of an example of the method of FIG. 3 or FIG. 4.

FIG. 5 depicts an example of images acquired via the imaging system 30, and an example of performance of the method 80. In this example, the battery component 36 is a graphite silicon blended anode formed as a coating on a current collector. The thickness of the coating is about 100 microns.

Heat is applied until the anode is heated to a uniform temperature, and optical images are taken. The images include a thermal image 91 of a region of the anode and an optical image 92 of the region. The thermal image 91 is mapped onto the optical image 92 based on, for example, large features that are visible in both images. In this example, one or more relatively large features having a selected size (e.g., length or diameter of at least about 100 microns) are identified and used for the correlation.

The thermal image 91 represents temperature, where lighter regions correspond to higher temperatures. For example, a lower temperature area 94 can be seen in which the pixels have purple or darker colors, and a higher temperature area 96 in which the pixels have lighter colors (yellow and orange).

In this example, the thermal image 91 is analyzed and a region 98 having a high temperature pattern is identified. The pattern in the region 98 is not determined in the visible image 92, indicating a potential internal defect.

If a temperature characteristic meets selected temperature criteria, the feature corresponding to the region 98 is considered a defect. The criteria may be an average temperature of the region 98 being at or above a threshold, or a maximum temperature of the region 98 being above a threshold. The criteria may also be a difference between the temperature of the region 98 and a temperature of a surrounding region.

To facilitate identification of defects, micro-scale and/or elemental analysis may be performed on the component 36. In this example, an image 104 represents carbon concentration, an image 106 represents oxygen concentration, and an image 108 represents silicon concentration. As can be seen, the images 104 and 106 reveal patterns 109 and 110, respectively, that correspond to the region 98. In addition, a portion of the optical image 92 (including the region 98) can be microscopically imaged, producing a micro-scale image 100 that shows details of the region 98, and provides further confirmation that the region 98 is a splatter defect. Other microscale features may be identified, such as features in the image 108 shown as annotations 112.

The systems and methods described herein may be applicable to various types of batteries. In an embodiment, battery cells evaluated may be cells used in electric and/or hybrid vehicles; however, the systems and methods are not so limited.

Figure 6:
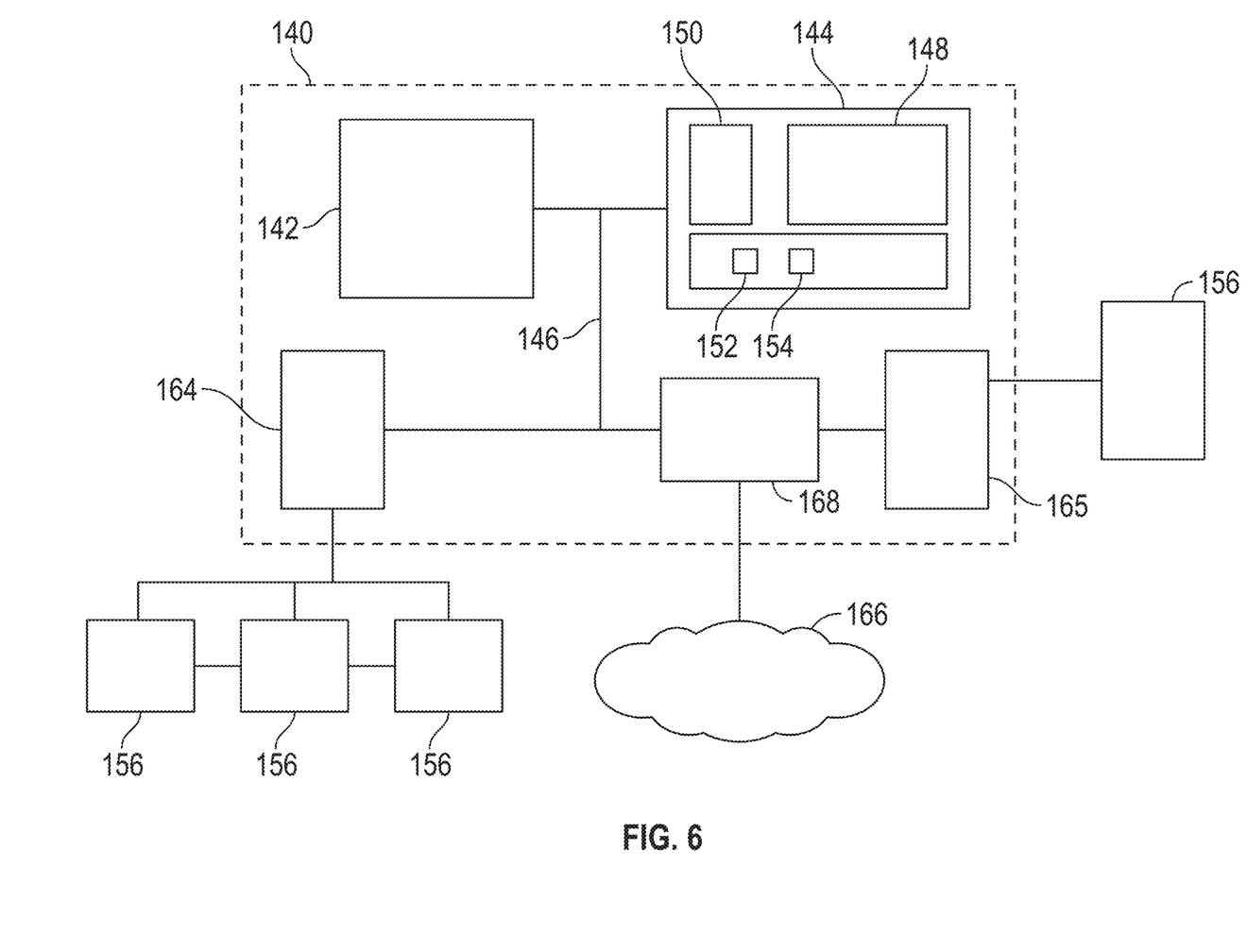
FIG. 6 depicts a computer system in accordance with an embodiment.

FIG. 6 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module or modules 152 may be included to perform functions related to acquiring images. An image analysis module 154 may be included for analysis of images as described herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 such as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

Embodiments described herein address a number of problems associated with technical fields related to battery cells. Such technical fields include battery cell manufacturing, testing and inspection, battery cell installation, and automotive fields in which battery cells are utilized. The problems include difficulties in detecting tears and other discontinuities (whether during or after manufacture). Problems can also occur in existing inspection techniques, such as inefficiencies resulting from the need for manual inspection and/or cell disassembly. The embodiments described herein provide solutions to these problems and thereby effectuate an improvement to the technical fields.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for inspecting a battery component, comprising:
   a heating device configured to heat a surface of the battery component to a selected temperature;
   an optical-visible imaging device configured to take an optical image of the surface;
   a thermal imaging device configured to take a thermal image of the surface; and
   a processor configured to acquire the optical image and the thermal image, and perform:
      correlating the thermal image with the optical image;
      identifying a feature of interest in at least one of the optical image and the thermal image, and determining a geometric characteristic and a temperature characteristic associated with the feature of interest; and determining whether the feature of interest is a defect based on the geometric characteristic and the temperature characteristic, wherein the determining includes, based on the feature of interest being a micro-scale feature, performing an elemental analysis of a portion of the surface having the micro-scale feature to generate an image representing elemental concentration, and comparing a pattern of the elemental concentration to a corresponding pattern in the thermal image.

2. The system of claim 1, wherein the battery component is an electrode of a battery.

3. The system of claim 1, wherein the heating device is configured to uniformly heat the battery component, the heating device including at least one of a heating element configured to directly contact the battery component, a non-contact device, and a heating chamber.

4. The system of claim 1, wherein the micro-scale feature includes at least one of: a surface feature, and an internal feature disposed below the surface.

5. The system of claim 1, wherein the system is configured to automatically inspect the battery component in conjunction with a battery cell manufacturing process.

6. The system of claim 5, wherein the temperature characteristic is selected from at least one of: a temperature value, a temperature distribution, a temperature variation, and a difference between a first temperature at a location corresponding to the feature of interest and a second temperature at another location of the thermal image.

7. The system of claim 6, wherein the feature of interest is determined to be a defect based on the temperature characteristic corresponding to a reference temperature characteristic.

8. The system of claim 1, wherein at least one of the optical-visible imaging device and the thermal imaging device has a resolution selected distinguish the micro-scale feature.

9. The system of claim 1, wherein determining whether the feature of interest is a defect is performed based on associating the geometric characteristic and the temperature characteristic with a known defect based on a look up table.

10. A method of inspecting a battery component, comprising:

acquiring an optical image of a surface of the battery component and a thermal image of the surface, wherein at least one of the optical image and the thermal image is taken when the surface is heated to a selected temperature;

correlating the thermal image with the optical image;

identifying a feature of interest in at least one of the optical image and the thermal image, and determining a geometric characteristic and a temperature characteristic associated with the feature of interest; and determining whether the feature of interest is a defect based on the geometric characteristic and the temperature characteristic, wherein the determining includes, based on the feature of interest being a micro-scale feature, performing an elemental analysis of a portion of the surface having the micro-scale feature to generate an image representing elemental concentration, and comparing a pattern of the elemental concentration to a corresponding pattern in the thermal image.

11. The method of claim 10, wherein the micro-scale feature includes at least one of: a surface feature, and an internal feature disposed below the surface.

12. The method of claim 10, wherein the acquiring is performed in conjunction with a battery cell manufacturing process.

13. The method of claim 12, wherein the temperature characteristic is selected from at least one of: a temperature value, a temperature distribution, a temperature variation, and a difference between a first temperature at a location corresponding to the feature of interest and a second temperature at another location of the thermal image.

14. The method of claim 13, wherein the determining includes, based on the feature of interest being a micro-scale feature, determining that the micro-scale feature is a defect based on the feature of interest having a diameter that is greater than a reference diameter of a blended particle.

15. The method of claim 10, wherein at least one of the optical image and the thermal image is taken at a resolution selected to distinguish the micro-scale feature.

16. The method of claim 10, wherein determining whether the feature of interest is a defect is performed based on associating the geometric characteristic and the temperature characteristic with a known defect based on a look up table.

17. A computer program product for inspecting a battery component, the computer program product that has computer-executable instructions stored thereupon on a non-transitory computer-readable medium, the computer-executable instructions when executed by a processor cause the processor to perform operations comprising:

acquiring an optical image of a surface of a battery component and a thermal image of the surface, wherein at least one of the optical image and the thermal image is taken when the surface is heated to a selected temperature;

correlating the thermal image with the optical image;

identifying a feature of interest in at least one of the optical image and the thermal image, and determining a geometric characteristic and a temperature characteristic associated with the feature of interest; and determining whether the feature of interest is a defect based on the geometric characteristic and the temperature characteristic, wherein the determining includes, based on the feature of interest being a micro-scale feature, performing an elemental analysis of a portion of the surface having the micro-scale feature to generate an image representing an elemental concentration, and comparing a pattern of the elemental concentration to a corresponding pattern in the thermal image.

18. The computer program product of claim 17, wherein the temperature characteristic is selected from at least one of: a temperature value, a temperature distribution, a temperature variation, and a difference between a first temperature at a location corresponding to the feature of interest and a second temperature at another location of the thermal image.

19. The computer program product of claim 18, wherein the determining includes, based on the feature of interest being a micro-scale feature, determining that the micro-scale feature is a defect based on the feature of interest having a diameter that is greater than a reference diameter of a blended particle.

20. The computer program product of claim 17, wherein at least one of the optical image and the thermal image is taken at a resolution selected to distinguish the micro-scale feature.

* * * * *